(12) United States Patent  
Van Den Herik

(10) Patent No.: US 6,253,032 B1
(45) Date of Patent: Jun. 26, 2001

(54) STUDIO CAMERA VIEWFINDER

(75) Inventor: Florus B. Van Den Herik, Breda (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/442,962

(22) Filed: Nov. 18, 1999

(30) Foreign Application Priority Data

Nov. 18, 1998 (EP) .................................................. 98203907

(51) Int. Cl.[7] .................................................. G03B 13/02
(52) U.S. Cl. .................. 396/374; 396/383; 348/214; 348/333.06
(58) Field of Search .................. 348/143, 148, 348/157, 169, 211, 214, 333, 334, 333.06, 333.01; 396/56, 58, 374, 383, 429, 427

(56) References Cited

U.S. PATENT DOCUMENTS

| 4,118,720 | 10/1978 | Gottschalk | 354/81 |
|---|---|---|---|
| 4,672,436 | 6/1987 | Hawthorne | 358/93 |
| 5,432,597 | * 7/1995 | Parker et al. | 348/169 |
| 5,548,334 | 8/1996 | Ichiyoshi | 348/341 |
| 5,734,421 | 3/1998 | Maguire | 348/121 |
| 5,872,590 | * 2/1999 | Aritake et al. | 348/57 |
| 5,949,504 | 9/1999 | Kim | 349/59 |

FOREIGN PATENT DOCUMENTS

| 0665686A2 | 8/1995 | (EP) . |
|---|---|---|
| 08098066A | 4/1996 | (JP) . |
| 9604750A1 | 2/1996 | (WO) . |

* cited by examiner

Primary Examiner—David M. Gray
(74) Attorney, Agent, or Firm—Steven R. Biren

(57) ABSTRACT

In a studio camera (SC), comprising an image pickup unit (PUU) for converting a scene into image signals, and a viewfinder (VF) for displaying the image signals on a viewfinder display (D), the viewfinder (VF) having a position adjustment mechanism (PAM) for allowing a camera operator (CO) to have an optimal view on the viewfinder display (D), the position adjustment mechanism (PAM) is automatically controlled so as to direct the viewfinder display (D) to the camera operator (CO).

3 Claims, 1 Drawing Sheet

STUDIO CAMERA VIEWFINDER

BACKGROUND OF THE INVENTION

The invention relates to a viewfinder for a studio camera, and to a studio camera provided with a viewfinder.

Studio camera viewfinders are hand-adjusted to allow the camera operator to have a good view on what is picked up by the camera. Especially for viewfinders having an LCD display, known for having a large viewing angle dependency of the display, it is very important that the camera operator continuously has a good view on the viewfinder display. To adjust the viewfinder orientation, the viewfinder is provided with a pan and tilt mechanism that is to be operated by the camera operator, who for this purpose, has to remove his hands from the camera controls (sharpness, zooming, pan, tilt).

SUMMARY OF THE INVENTION

It is, inter alia, an object of the invention to facilitate a camera operator's work. To this end, primary aspects of the invention provide a camera viewfinder unit, a studio camera, and a head-mountable transmitter as defined in the independent claims. Advantageous embodiments are defined in the dependent claims.

In a studio camera in accordance with the present invention, comprising an image pickup unit for converting a scene into image signals, and a viewfinder for displaying the image signals on a viewfinder display, the viewfinder having a position adjustment mechanism for allowing a camera operator to have an optimal view on the viewfinder display, the position adjustment mechanism is automatically controlled so as to direct the viewfinder display to the camera operator.

These and other aspects of the invention will be apparent from and elucidated with reference to the embodiments described hereinafter.

DESCRIPTION OF THE PREFERRED EMBODIMENTS

Figure 1:
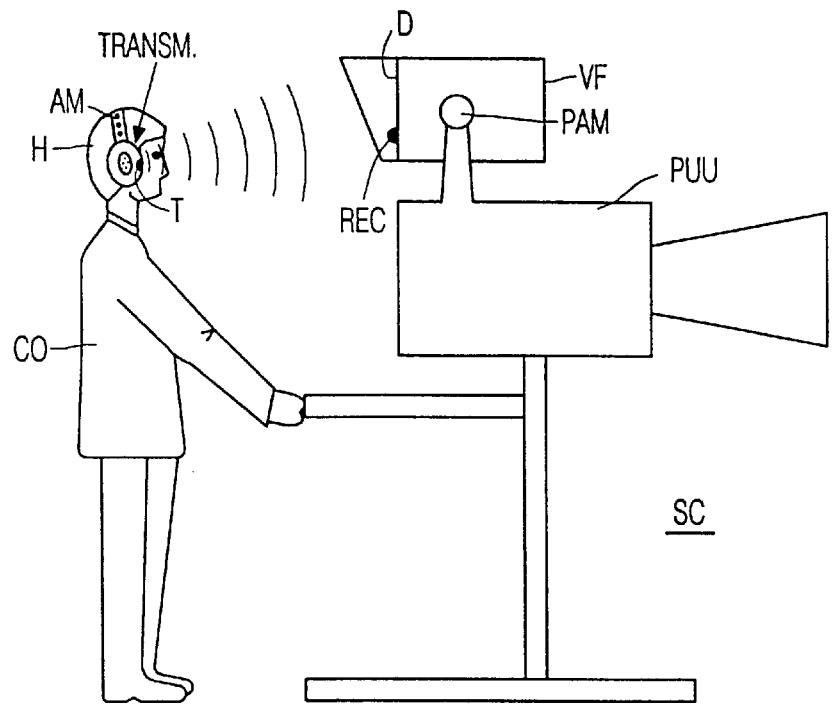
FIG. 1 shows an embodiment of a studio camera in accordance with the present invention.
Figure 2:
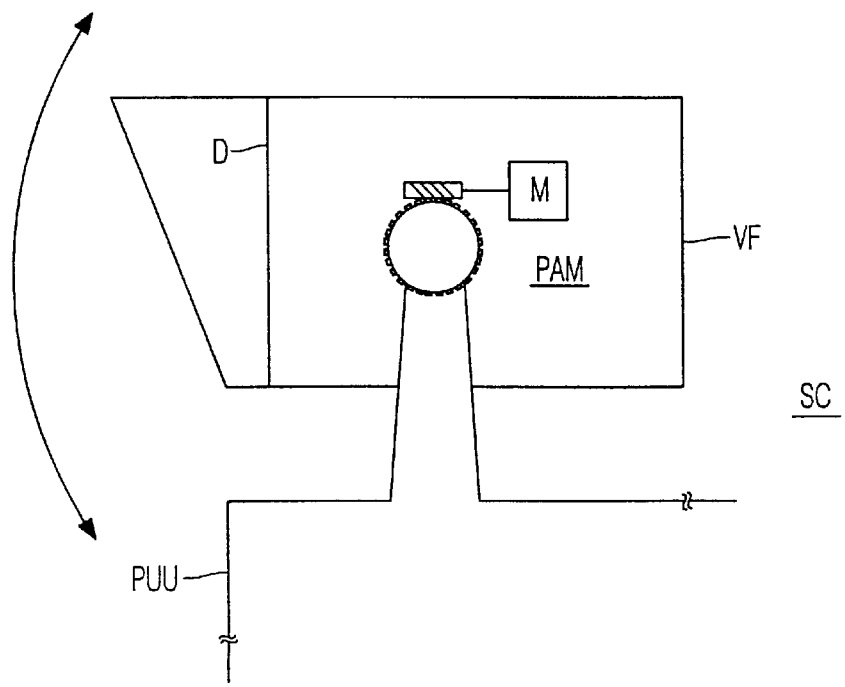
FIG. 2 shows parts of the studio camera of FIG. 1 in more detail.

In the embodiment of FIGS. 1 and 2, the studio camera SC comprises an image pickup unit PUU and a viewfinder VF. The viewfinder VF has a position adjustment mechanism PAM to automatically direct a viewfinder display D to a camera operator CO. In a simple embodiment, the position adjustment mechanism PAM just has a tilt motor M. Obviously, in more complex embodiments, other movements like panning are also possible. The position adjustment mechanism PAM is controlled by a receiver REC that receives position information signals from a transmitter TRANSM unit mounted on a head H of the camera operator CO. The transmitter unit TRANSM has a device for attaching the transmitter to the head H, and a proper transmitter T.

So, in a preferred embodiment, to ensure that a viewfinder VF is always directed to a camera operator's face (especially important if the viewfinder display D is an LCD having a viewing angle dependent visibility), the viewfinder VF is provided with a (tilt) motor M which is controlled by a transmitter TRANSM, preferably an optical transmitter, mounted on the cameraman's head H, preferably in his headphone, in such a manner that the viewfinder display D is always directed to the camera operator's face. Advantage: now that the camera operator CO no longer needs to adjust the viewfinder (tilt) angle manually, he can use both hands for controlling the camera SC.

It should be noted that the above-mentioned embodiments illustrate rather than limit the invention, and that those skilled in the art will be able to design many alternative embodiments without departing from the scope of the appended claims. In one alternative embodiment, the viewfinder's position adjustment mechanism comprises a gyroscope to ensure that the viewfinder display stays directed to the camera operator's face even if the image pickup unit is moved. In the claims, any reference signs placed between parentheses shall not be construed as limiting the claim. The word "comprising" does not exclude the presence of other elements or steps than those listed in a claim. The invention can be implemented by means of hardware comprising several distinct elements, and by means of a suitably programmed computer. In the device claim enumerating several means, several of these means can be embodied by one and the same item of hardware.

What is claim is:

1. A studio camera (SC), comprising:
   an image pickup unit (PUU) for converting a scene into image signals; and
   a viewfinder (VF) for displaying said image signals on a viewfinder display (D), said viewfinder (VF) having a position adjustment mechanism (PAM) for allowing a camera operator (CO) to have an optimal view on said viewfinder display (D), wherein said position adjustment mechanism (PAM) is automatically controlled so as to direct said viewfinder display (D) to said camera operator (CO), and a transmitter unit (TRANSM) attached to said camera operator (CO), wherein said position adjustment mechanism (PAM) comprises at least one motor (M) for driving the viewfinder that is controlled by a receiver (REC) for receiving signals from said transmitter unit (TRANSM) attached to said camera operator (CO).

2. A studio camera viewfinder (VF), comprising:
   a viewfinder display (D) for displaying image signals from an image pickup unit (PUU); and
   a position adjustment mechanism (PAM) for allowing a camera operator (CO) to have an optimal view on said viewfinder display (D), wherein said position adjustment mechanism (PAM) is automatically controlled so s to direct said viewfinder display (D) to said camera operator (CO), and a transmitter unit (TRANSM) attached to said camera operator (CO), wherein said position adjustment mechanism (PAM) comprises at least one motor (M) for driving the viewfinder that is controlled by a receiver (REC) for receiving position control signals from said transmitter unit (TRANSM) attached to said camera operator (CO).

3. A head-mountable transmitter unit (TRANSM) for a studio camera (SC) as claimed in claim 1, comprising:
   means (AM) for attaching said transmitter unit (TRANSM) to a camera operator's (CO) head (H); and
   means (T) for transmitting position control signals.

* * * * *